United States Patent
Liu et al.

(10) Patent No.: US 9,734,559 B1
(45) Date of Patent: Aug. 15, 2017

(54) MATCH ERROR COMPENSATION FOR SUPER-RESOLUTION IMAGES

(71) Applicant: PIXELWORKS, INC., Portland, OR (US)

(72) Inventors: Guodong Liu, Shanghai (CN); Junhua Chen, Shanghai (CN); Neil Woodall, Newport Beach, CA (US); Yue Ma, Pleasanton, CA (US); Bob Zhang, Santa Clara, CA (US)

(73) Assignee: PIXELWORKS, INC., Portland, OR (US)

( * ) Notice: Subject to any disclaimer, the term of this patent is extended or adjusted under 35 U.S.C. 154(b) by 347 days.

(21) Appl. No.: 14/553,817

(22) Filed: Nov. 25, 2014

(51) Int. Cl.
*G06T 3/40* (2006.01)

(52) U.S. Cl.
CPC .. *G06T 3/4076* (2013.01); *G06T 2207/20016* (2013.01)

(58) Field of Classification Search
None
See application file for complete search history.

(56) References Cited

U.S. PATENT DOCUMENTS

| | | | |
|---|---|---|---|
| 9,317,903 B1 * | 4/2016 | Liu | G06T 5/003 |
| 9,483,840 B1 * | 11/2016 | Liu | G06T 3/4053 |
| 2012/0086850 A1 * | 4/2012 | Irani | G06T 3/4053 |
| | | | 348/441 |

* cited by examiner

*Primary Examiner* — Michael J Cobb
(74) *Attorney, Agent, or Firm* — Marger Johnson

(57) ABSTRACT

A method of compensating for match errors while generating a super-resolution image, includes receiving, at a processor, an input image having a first resolution forming a low resolution layer, identifying a patch in a unknown high resolution image layer, identifying a corresponding low resolution patch in the low resolution layer, finding at least one matched patch in a match layer having a resolution lower than the first resolution, identifying at least one copy patch in a copy layer having a resolution lower than the high resolution layer, the copy patch to be copied to the high resolution layer, determining an match error between the at least one matched patch and a corresponding low resolution patch, selecting a matrix to transform the match error to provide compensation for the high resolution patch as match error compensation, and modifying the high resolution patch using the match error compensation.

15 Claims, 7 Drawing Sheets

MATCH ERROR COMPENSATION FOR SUPER-RESOLUTION IMAGES

RELATED APPLICATIONS

This application is related to the following pending US Patent applications, all of which are incorporated by reference in their entirety herein:

U.S. patent application Ser. No. 14/036,671, "Recovering Details in Single Frame Super Resolution Images;"

U.S. patent application Ser. No. 14/036,718, "Recovering Details in Single Frame Super Resolution Images;" and U.S. patent application Ser. No. 14/011,532, "Self-Similarity Based Single Frame Super Resolution."

BACKGROUND

Display devices continue to increase in resolution while the vast majority of image or video sources still have lower resolutions. Various techniques have evolved to provide higher resolution video images, many of which are referred to as super-resolution, such as multi-frame and self-similarity, or single-frame. However, the texture and details recovered by these methods may have portions that look unnatural, like an oil painting or a plastic object. The details near the edges may be lost, while the edges are very sharp. Colors may change dramatically with no transition.

In the self-similarity process, a higher resolution image results from one or more iterations of matching and scaling patches from an input, lower resolution image to a higher output resolution image. These artifacts result from the nature of the matching process. No perfectly matched patches exist across several or all scaled versions of the input, lower resolution image. Because of the iterative nature of this process, from coarse resolution to fine, if the previously generated image layer does not have good performance, the next layer will not be recovered because the error propagates from layer to layer. The final high resolution layer will look unnatural, most noticeably in texture regions and detail regions near strong edges.

DETAILED DESCRIPTION OF THE EMBODIMENTS

Self-similarity based super-resolution utilizes patch similarity among different-scale layers of an input low resolution (LR) image. Therefore, given a low resolution patch, its high resolution (HR) version comes from some layers of this input low resolution image. Moreover, the self-similarity based super-resolution is done with several iterations from coarse to fine. The method of upscaling in each layer is named self-similarity upscaling.

Figure 1:
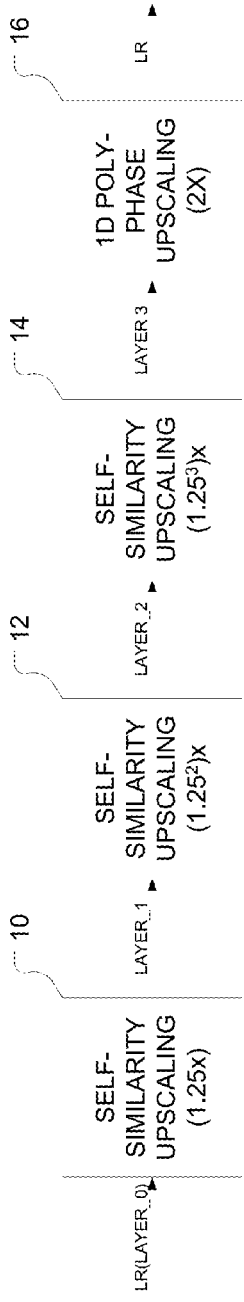
FIG. 1 shows flowchart of an embodiment of a self-similarity super resolution process.

This discussion uses 2× upscaling as an example. The method discussed here can be easily generalized to other scaling ratios. One may assume the scaling ratio between adjacent image layers is 1.25, but other ratios are also possible. The process performs 3 iterations of self-similarity upscaling, and then a simple 1D upscaling with high-quality filters to reach the final 2× image. FIG. 1 shows an example of such a process. In FIG. 1, a low resolution input image is received at 10 as the first or initial layer, Layer 0. A first self-similarity super resolution upscaling process scales the low resolution image to a 1.25× image to produce the second layer, Layer 1. A second self-similarity upscaling process 12 scales the 1.25× image up another 1.25 times to achieve a 1.56 upscaling, as the third layer, layer 2. At 14, the 1.56 upscaled image is upscaled again 1.25 resulting in a 1.95 or approximately a 2× upscaling, to produce a third layer, layer 4. The simple 1D upscaling mentioned above then occurs at 16, resulting in the final 2× image.

Figure 2:
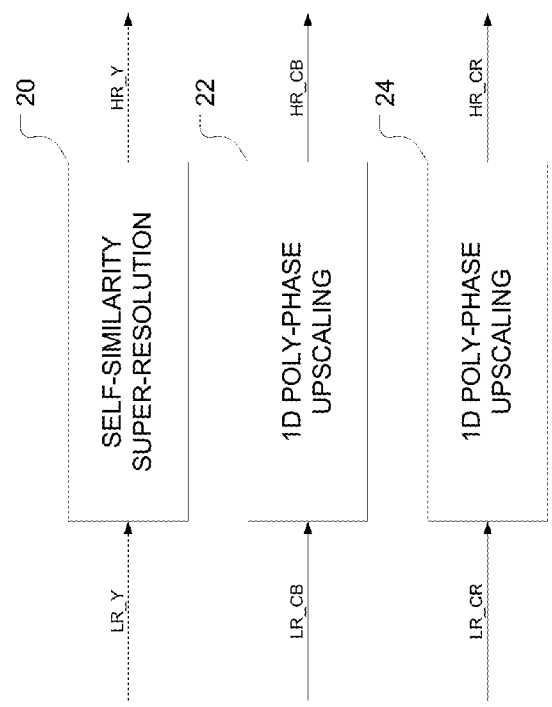
FIG. 2 shows a flowchart of an embodiment of a three-channel super resolution process.

All color channels, such as Y, Cb and Cr, can be processed by self-similarity based super-resolution. However, in order to simplify the process, typically only Y is processed, and the chroma components are upscaled by 1D poly-phase interpolation with high-quality filters. This is shown in FIG. 2. In FIG. 2, the luminance component Y is processed with self-similarity super resolution at 20. Each of the chroma components LR_CB, and LR_CR, are processed with 1D polyphase upscaling to the appropriate level of scaling at 22 and 24.

For an unknown high resolution layer n, its previous layers, layer (n−1), layer (n−2), etc. are all known. They are generated by down-sampling an input low resolution image or by the self-similarity upscaling during previous iterations. The input image in the discussion below is layer (n−1), or 32 in FIG. 3. The high resolution layer is 30 and the lower or lowest resolution layer is 34.

Figure 3:
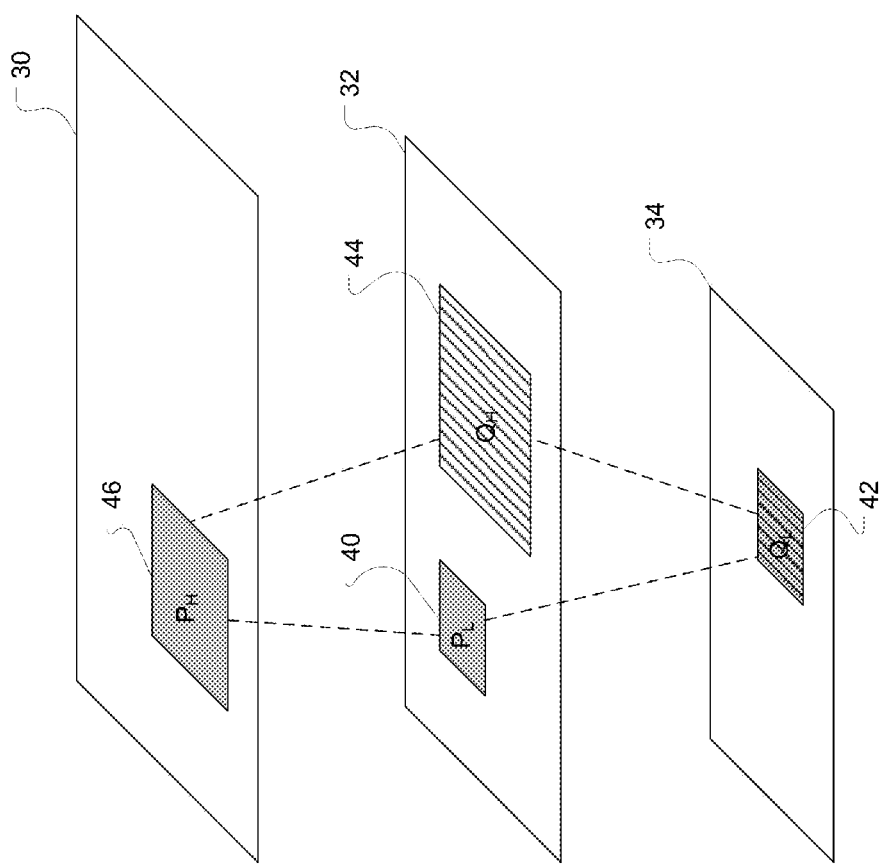
FIG. 3 shows an embodiment of super-resolution process with the associated patches.

In order to get a high resolution pixel or patch 46 in layer n 30, the process first projects it to one or several of previous layers, and fetches the low resolution patches around these projection positions. In FIG. 3, the input patch 40, which may result from an initial low resolution input image, or an input image from a previous iteration of the self-similarity super resolution. For each low resolution patch such as 40, the process finds its most matched patch 42 from one or several layers whose resolutions are smaller than or equal to layer n−2 34, then copies its corresponding high resolution projected path 44 in layer 32. Note that in general patch 44 does not need to be in layer 32 as described in the copending applications. The process then fuses all these high resolution patches based on sum of difference (SAD) or other rules. Finally, back projection may be used to insure that the high resolution layer is consistent with the low resolution layer.

Experiments using many images have found that only fetching a low resolution patch from layer n−1, then finding the best matched patch from layer n−2, and then copying the corresponding high resolution patch in layer n−1 can achieve almost the same performance as the complex method mentioned above. In order to simplify the description, the simpler method is used as an example, but the approach applies to all self-similarity methods. FIG. 3 shows an example of a self-similarity super resolution process.

In the process, finding a best matched patch results in higher super-resolution quality. Commonly, for a low resolution patch 40 $P_L$ in layer n−1, block matching is done between it with all the patches, including sub-pixel patches, in layer n−2 in order to find the best matched patch 42 $Q_L$. However, its computational cost is very high. From many experiments, a good alternative is that block matching is done between $P_L$ and all the patches in a window around $P_L$'s projection position in layer n−2. The measurement of block matching can be SAD, (sum of absolute differences), sum of squares of differences (SSD), or weighted SSD. Though it is much simpler, a SAD measurement can give a comparable performance as SSD and weighted SSD for most cases. Because of its simplicity and comparability, SAD is selected as a matching measurement. However, while the discussion focuses on SAD it may be applicable to SSD, weighted SSD, or other match measurements.

Given a low resolution patch $P_L$, in order to get its high resolution patch $P_H$ 44, the process first finds the best matched patch $Q_L$ 42 of $P_L$ in a window in layer 34. The high resolution patch $Q_H$ of $Q_L$ is known. This allows one to build the relationship between unknown $P_H$ and known $Q_H$, $Q_L$, and $P_L$. In order to facilitate the analysis, henceforth, for any patch, the process takes its elements column-wise, and reshapes it to a column vector. These patches are shown in shown in FIG. 3.

Let $P_H$=f($P_L$). The function $f$ is to build the relationship between a low resolution patch and its high resolution version. Using 1st order Taylor expansion to approximate this equation results in:

$$P_H=f(Q_L+P_L-Q_L)\approx f(Q_L)+f'(Q_L)*(P_L-Q_L).$$

Here, $f'$ is the 1st order partial derivative of $f$.

It is obvious that $Q_H$=f($Q_L$), so $$P_H\approx Q_H+f'(Q_L)*(P_L-Q_L).$$

It is reasonable to approximate $f'(Q_L)$ by a transform matrix T.

So, $P_H\approx Q_H+T*(P_L-Q_L)$. It is equivalent to $P_H-Q_H\approx T*(P_L-Q_L)$ $P_L-Q_L$ is the match error, $P_H-Q_H$ is its high resolution version.

The transformation matrix T describes the relationship between match error and its high resolution version. From another perspective, T represents a filter that is optimized for scaling the low resolution patch errors to a high resolution version. From the analysis, the transformation matrix T is dependent on the matched patch $Q_L$. If the transformation matrix is known, the high resolution patch is easily derived. In the following, T is taken as regression coefficient matrix.

In summary, an existing self-similarity matching algorithm is used to find the best estimate ($Q_H$) for the high resolution patch ($P_H$). Then a transformation matrix is used to scale up the residual error between the known low resolution versions ($Q_L$ & $P_L$) to correct the residual errors. If the same transformational matrix can apply a cluster of ($P_L-Q_L$) and $Q_L$ matrixes, this results in:

$$P_H\approx Q_H+T_i*(P_L-Q_L)$$

where $T_i$ represents the transformation matrix for a cluster of matrixes that ($P_L-Q_L$) and $Q_L$ belong to.

One approach to applying the correction is to treat $T_i$ as a linear scaling operation. For example, by using a polyphase filter. In this case, there is only one T. Use of this simple patch match error scaling results in a significant reduction of oil painting artifacts as set out in one or more of the copending patent applications. However, more sophisticated approaches can lead to further improvement since the pattern of the patch error itself may have clues about what the high frequency correction should look like.

The transformation matrix T is learned by training many training images. These images should be of high quality and without noise, such as random noise, compression noise, etc. They should include a variety of content including people, animal, plant, landscape, artificial scene like desktop image, graphics, etc.

As it is known, the scaling ratio between adjacent image layers is fractional, so there are several kinds of pixel mapping modes between low resolution patch and its high resolution version. Examples may use a case with a scaling ratio between adjacent layers of 1.25, the size of the HR patch is 4×4, and size of the LR patch size is also 4×4 as an example. Its pixel mapping modes in one direction are shown in FIG. 4.

Figure 4:
FIG. 4 shows a graphical representation of one embodiment of a mapping mode.

In FIG. 4, the high resolution layer pixels are shown as circles 50, and the low resolution pixels are shown as squares such as 52. For this particular embodiment, there are at most 25 pixel mapping modes. Examples of different mapping modes are shown in Case0 through Case4. In general, transformation matrixes should be different for each pixel mapping mode. If upscaling is proceeded in unit of non-overlapping patch, such as 2×2 patch, rather than pixel, then there are only few pixel mapping modes whose transformation matrixes need to be learned. For example, upscaling is done in unit of 2×2 low resolution patch as: for each 2×2 patch in low resolution layer n−1, extend it to a 4×4 patch, then find the most matched 4×4 patch in layer n−2, then copy a corresponding 4×4 patch in layer n−1 as the high resolution patch in layer n. The neighboring high resolution patches are overlapped.

Figure 5:
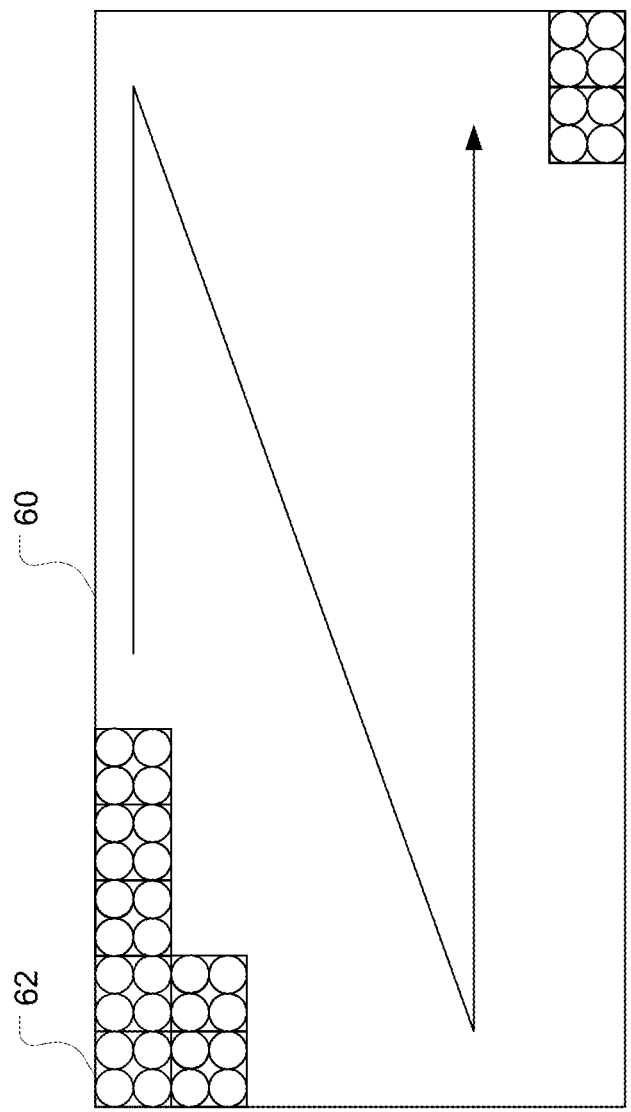
FIG. 5 shows an embodiment of a scanning order of low resolution patches.
Figure 6:
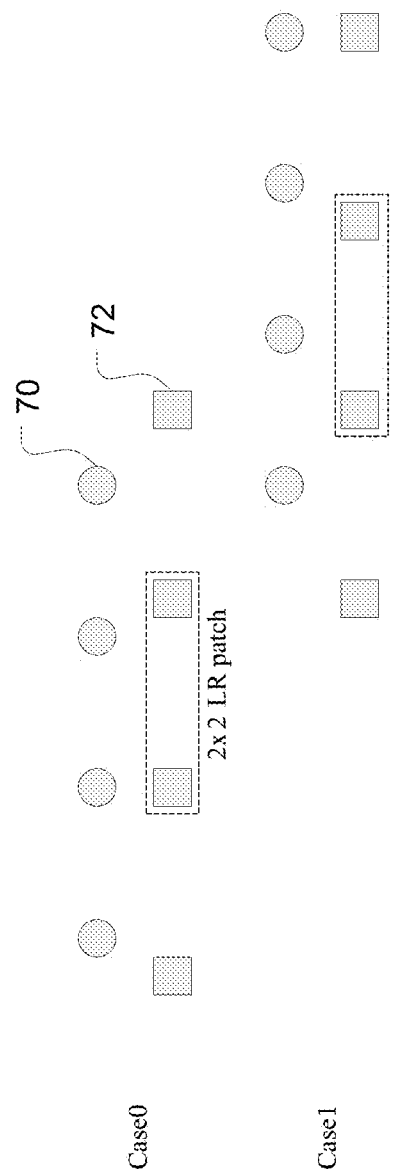
FIG. 6 shows a graphical representation of one embodiment of a mapping mode.

FIG. 5 shows this example of getting high resolution patches for all 2×2 low resolution patches such as 62 in a layer 60, which are processed in a scanning order from top left to bottom right. In this embodiment, there are only 2 pixel mapping modes, Case0 and Case1, for each direction whose transformation matrixes need to be learned. FIG. 6 shows the needed pixel mapping modes in which circles such as 70 represent high resolution pixels and squares such as 72 represent low resolution pixels. For a pixel mapping mode, the process first collects all samples to calculate transformation matrixes.

The collection process is as follows. For each training image, named layer n, the process first down-samples it by using poly-phase filter to get image layer n−1, then down-sample image layer n−1 using the same filter to get image layer n−2. For each high resolution patch $P_{Hi}$ corresponding to current pixel mapping mode in layer n, the process projects it into layer n−1 to get low resolution patch $P_{Li}$. The process then projects $P_{Li}$ to layer n−2 to get a search window around the projection position, then find the most matched $Q_{Li}$ from the window, its high resolution patch $Q_{Hi}$ is at the corresponding position in layer n−1. During the matching, the SAD between $P_{Li}$ and $Q_{Li}$, named $SAD_{Li}$, is derived. The process then records this training sample: $P_{Li}$, $P_{Hi}$, $Q_{Li}$, $Q_{Hi}$, and $SAD_{Li}$.

Theoretically, each sample should have its own transform matrix. Unfortunately, if the high resolution version is unknown, then one does not know the transformation matrix. However, statistically, it is reasonable that all similar samples have similar transformation matrixes. Therefore, it is enough to learn one transformation matrix for each class of similar patches. In addition, because the transformation matrix applies to the residual errors of the self-similarity process, the approximation is less likely to cause objectionable artifacts.

After getting all the data from the training samples, they will be clustered according to the combined vector of $Q_{Li}$ minus its pixel mean and $SAD_{Li}$ multiplied by a gain kg, i.e., $[Q_{Li}-\text{mean}(Q_{Li}), kg*SAD_{Li}]$, by using a clustering algorithm such as k-means. The use of the SAD in the clustering algorithm follows from the Taylor series expansion:

$$P_H \approx Q_H + f'(Q_L)*(P_L-Q_L)$$

That is, the transformational matrix is likely to be related to both $f'(Q_L)$ and $(P_L-Q_L)$. Therefore determining the cluster based on $Q_L$ representing the $f'(Q_L)$ dimension and the SAD representing the $(P_L-Q_L)$ dimension is likely to lead to good results. The values could also be normalized, for example by dividing all of them by the norm $\|QLi-\text{mean}(QLi)\|$. Furthermore, each class or cluster should have enough samples. After clustering, each sample is classified into the closest class.

For each class k, using all samples in it, a transform matrix $T_k$ is calculated by minimizing an objective function $$g = \sum_i \|P_{Hi} - Q_{Hi} - T_k*(P_{Li} - Q_{Li})\|^2$$

The g is the regression formula.

Let $D_{Hi}=P_{Hi}-Q_{Hi}, D_{Li}=P_{Li}-Q_{Li}$.

$T_k$ can be easily computed by least square method as follows.

$$T_k = \left(\sum_i D_{Hi}D_{Li}^T\right)(D_{Li}D_{Li}^T)^{-1}$$

Figure 7:
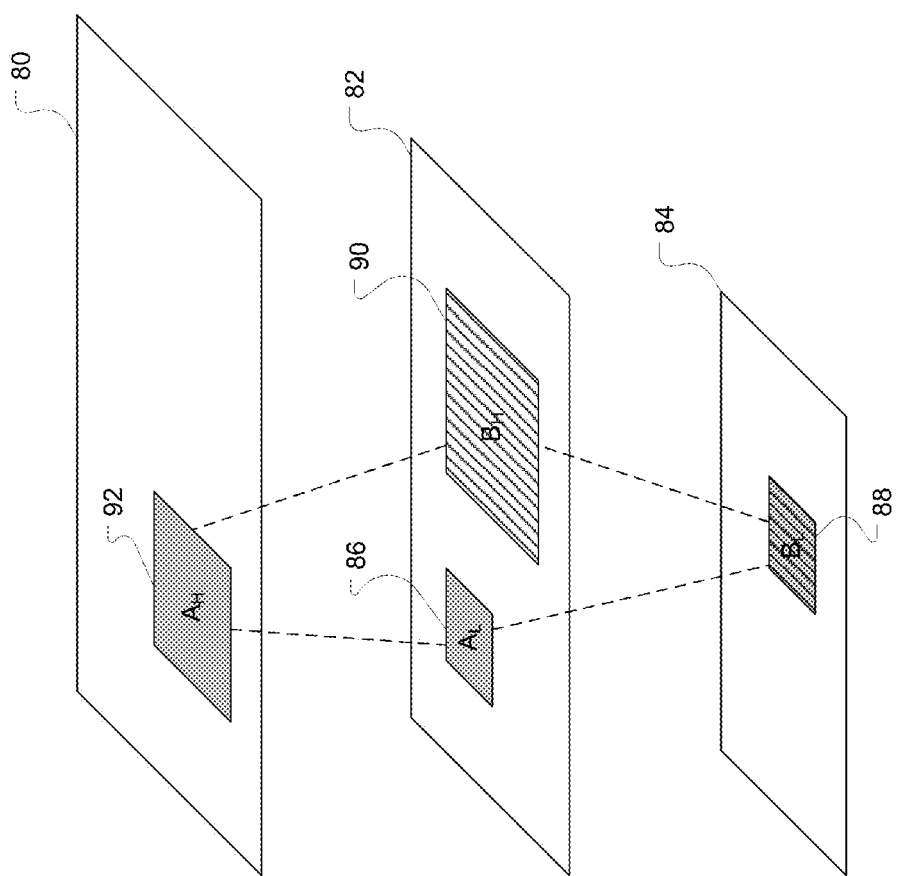
FIG. 7 shows an embodiment of a process of combining match error compensation with patch copy.

In order to get a patch $A_H$ 92 in the unknown high resolution image layer n 80, the process first projects it to low resolution image layer n−1 82 to get a corresponding low resolution patch $A_L$ 86. The process then finds the most matched patch $B_L$ 88 in layer n−2 84 for $A_L$, the SAD between $A_L$ and $A_H$ (named $SAD_L$) is also derived. The high resolution patch 90 $B_H$ corresponding to $B_L$ is then copied from layer n−1 82, as shown in FIG. 7.

The process then determines the pixel mapping mode between $A_H$ and $A_L$. According to the combined vector of $B_L$ minus its mean and $SAD_L$ multiplied by a gain kg, decide the closest class k. The transformation matrix $T_k$ of it is appropriate to compensate match error.

Then $A_H$ is calculated as $A_H=B_H+T_k*(A_L-B_L)$, and $T_k*(A_L-B_L)$ is the match error compensation item for high resolution patch. That is, it represents feeding forward the error between an ideal match whether it be for a dictionary approach or the described self-similarity for the known low resolution images to the unknown high resolution images.

For a pixel in the low resolution patch $A_L$, if it is on or very close to a strong edge, the match error for this pixel between $A_L$ and $B_L$ may be big even though its high resolution pixel is good enough. Moreover, from many experiments, the classical self-similarity algorithm can perfectly recover strong edges. If match error compensation is done too aggressively for these pixels, a ringing or overshooting artifact will probably occur in the high resolution images. Therefore, it is necessary to adjust the match error for each pixel.

First, the process calculates a weight according to edge magnitude for each pixel in layer n−1. The weight is in the range [0, 1]. The bigger the edge magnitude is, the smaller the weight is. Therefore, the pixel fetches the weight for each pixel in $A_L$. The weights compose a vector W. The match error is refined as $W.*(A_L-B_L)$. The '.*' represents the multiplication of corresponding elements, Finally, the high resolution patch is calculated as $A_H=B_H+T_k*(W.*(A_L-B_L))$.

Figure 8:
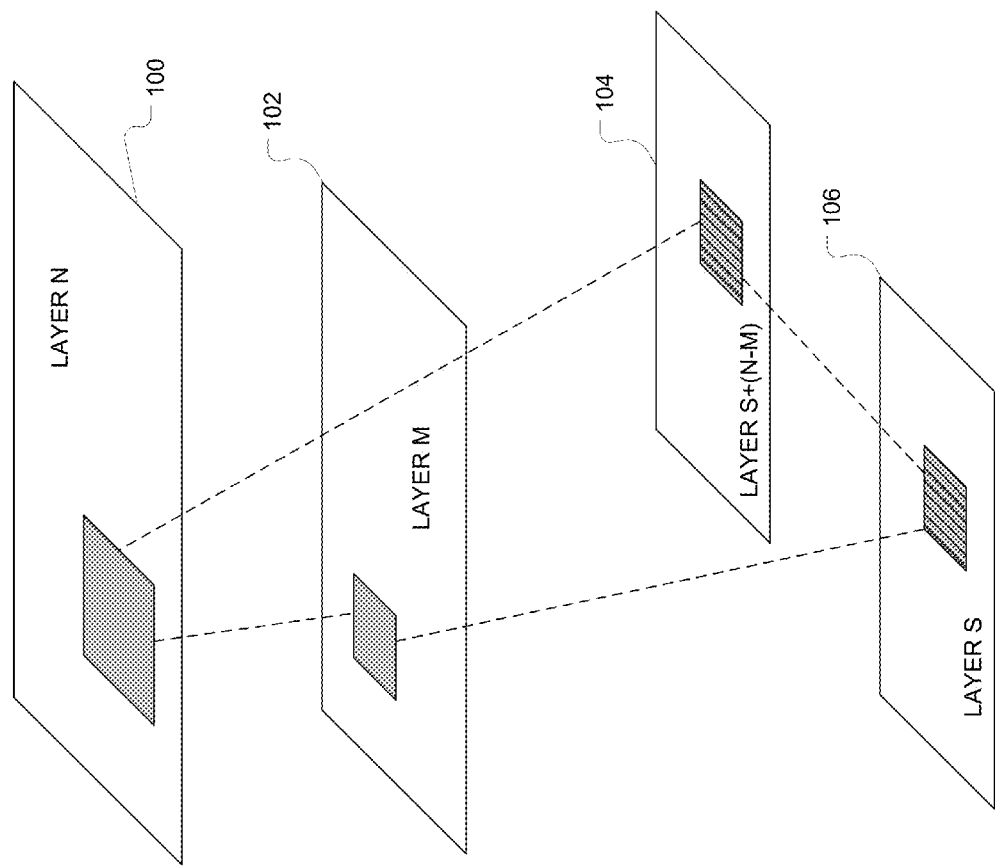
FIG. 8 shows an embodiment of another process of combining match error compensation with patch copy.

In a typical self-similarity method, the pixels for copying and matching can come from different kinds of image layers. In order to get a high resolution pixel or patch in layer n 100, referred to as the high resolution layer, the process projects it to a low resolution patch layer m 102, referred to here as the reference or the low resolution layer. The process then finds its most matched patch from layer s 106, referred to here as the match or lower resolution layer. The process then copies its corresponding high resolution from layer s+(n−m) 104, referred to her as a copy layer. FIG. 8 shows an example of this process.

One should note that in FIG. 8, the match layer and the copy layer are two different layers. Referring back to FIG. 3, in a simpler case the match layer and the copy layer are the same layer 32.

One should note that the process may involve copying multiple patches to a same location in the high resolution layer. The copying process involves a fusing of the multiple patches together to form the patch in the high resolution layer, rather than just copying a lower resolution patch to the location. The multiple patches may come from one or more of the lower resolution layers.

Compared with the typical self-similarity method, combining the self-similarity and match error compensation in a super-resolution process creates more natural looking high resolution images. Because the match error is usually in the high frequency part, it provides many more details than before.

Additionally, compared with typical dictionary based super-resolution, it effectively exploits self-similarity inside the input image and retrieves information brought by the match error from a training library. Therefore, its image quality is superior to dictionary based methods. It also keeps sharpness of edges and recovers appreciable details. It does not need to store high-precision low and high resolution dictionaries, but just the simpler transformation matrixes. Moreover, at the reconstruction stage, it does not need to calculate sparse coefficients, it only needs to determine the class the patch belongs to and select the corresponding transformation matrix a much simpler process.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the embodiments here.

What is claimed is:

1. A method of compensating for match errors in a process for generating a super-resolution image, comprising:
   receiving, at a processor, an input image having a first resolution forming a low resolution layer;
   identifying a patch in an unknown high resolution image layer having a resolution higher than the first resolution;
   identifying a corresponding low resolution patch in the low resolution layer;
   finding at least one matched patch in a match layer having a resolution lower than the first resolution;
   identifying at least one copy patch in a copy layer having a resolution lower than the high resolution layer, the copy patch to be copied to the high resolution layer;

determining a match error between the at least one matched patch and the corresponding low resolution patch;

selecting a matrix to transform the match error to provide compensation for the high resolution patch as match error compensation; and modifying the high resolution patch using the match error compensation.

2. The method of claim 1, wherein selecting the matrix to transform the match error to add to the copy patch comprises identifying a transformation matrix for the low resolution patch.

3. The method of claim 2, wherein selecting the transformation matrix comprises:

checking a pixel mapping mode between the low resolution patch and the unknown high resolution patch; and determining a class to which the match error belongs; and selecting the transformation matrix based upon the class.

4. The method of claim 3, wherein determining a class to which the error belongs comprises:

removing a mean value from the matched patch; and multiplying a gain by a difference measure between the low resolution patch and the matched patch; and combining them into a vector; and finding a class whose center is closest to the combined vector.

5. The method of claim 2, wherein transforming the error comprises:

calculating an edge magnitude for each pixel in low resolution patch; adaptively weighting the match error based on edge magnitudes; and multiplying the transformation matrix by the match error.

6. The method of claim 2, wherein identifying the transformation matrixes comprises learning transformation matrixes for each of a pixel mapping mode between corresponding high resolution patches and low resolution patches.

7. The method of claim 2, wherein learning the transformation matrixes for each pixel mapping mode comprises:

using high resolution training images to generate the low resolution layer, the match layer and the copy layer;

finding the at least one matched patch in match layer for each low resolution patch in low resolution layer;

using the combined features of each matched patch minus its mean and a difference measure between the matched patch and low resolution patch as a training sample to do clustering of the samples; and learning a transformation matrix for each cluster by using regression.

8. The method of claim 7, wherein learning a transformation matrix for each cluster comprises:

solving a matrix that minimizes a sample error of all samples, wherein the sample error is a known high resolution patch for the sample minus the copy patch and minus a product of the matrix and a difference between the low resolution patch and matched patch for that sample.

9. The method of claim 2, wherein the transformation matrix comprises one of a regression coefficient matrix, or a polyphase filter resulting from a set of training images.

10. The method of claim 1, wherein receiving an input image comprises receiving an original input image.

11. The method of claim 1, wherein receiving an input image comprises receiving an upscaled image from a previous iteration of a super resolution process.

12. The method of claim 1, wherein modifying the high resolution patch comprises adding the match error compensation to the copy patch.

13. The method of claim 1, wherein: finding at least one matched patch comprises finding multiple matched patches;

determining an error comprises determining errors between multiple ones of the matched patches and the low resolution patch in the low resolution layer determining multiple errors; and selecting a matrix to transform the error comprises selecting multiple matrixes for the corresponding multiple errors; and modifying the high resolution patch comprises adding multiple match error compensation to the corresponding multiple copy patches, and then fusing them based on a difference measure.

14. The method of claim 1, wherein the match layer and the copy layer are the same layers.

15. The method of claim 1, wherein the match layer and the copy layer are two different layers.

* * * * *